United States Patent Office 3,483,020
Patented Dec. 9, 1969

3,483,020
COMPOSITE SHEET ADHESIVES
Leon W. Giellerup, Carlton Hill, N.J., assignor to United Shoe Machinery Corporation, Flemington, N.J., a corporation of New Jersey
No Drawing. Filed Aug. 30, 1966, Ser. No. 575,964
Int. Cl. B44d 1/14; C09j 7/00
U.S. Cl. 117—76                                4 Claims

ABSTRACT OF THE DISCLOSURE

An adhesive film composite including a carrier sheet, an activatable adhesive layer and a thin anti-blocking layer in direct covering contact with a surface of the adhesive layer and disposed between the carrier sheet and the adhesive film serving to hold the adhesive film in readily separable relation to the carrier sheet, to protect the film against blocking after separation from the support and to be readily displaced from the surface of the adhesive film when the adhesive film is brought to active condition as by heat.

---

This invention relates to a composite sheet adhesive article for providing an activatable adhesive surface on an article and particularly to a film for providing a nonblocking activable adhesive surface on metallic sheet articles.

The attachment of sheet metal articles to surfaces, for example, the attachment of metal nameplates to appliances, has involved applying the adhesive as a preformed film carried on a release paper. Ordinarily the supported film of adhesive is adhered against the reverse side of a master sheet from which individual elements such as nameplates are to be cut. The master sheet with the supported film of adhesive is then cut into individual elements with the release paper still in place covering the adhesive film on its back. For attachment of the individual elements, the release paper must be stripped from the adhesive film and the element then heated and pressed against the article to which it is to be affixed. While this procedure is effective for attaching elements, such as nameplates, it has involved the disadvantage that the release paper must be left in place to prevent blocking or sticking together of the elements until just before attachment. Removal of the release paper at this time is awkward and time consuming particularly because of variations in the release qualities of the paper and because of the tendency of the paper to be sealed to the edges of the element by the die stamping or shearing operation for cutting out the elements from the master sheet.

It is an object of the present invention to provide a sheet adhesive article adapted to transfer activatable adhesive to an element, which adhesive is protected against adhesion until activation and yet is readily activated to secure the element to a desired surface.

To this end and in accordance with a feature of the present invention I have provided an adhesive film composite including a carrier sheet, an activatable adhesive layer and a thin anti-blocking layer united to the adhesive layer and disposed between the carrier sheet and adhesive film serving to hold the adhesive film in readily adhesive relation to the carrier sheet and to protect the adhesive film against blocking after separation from the support.

The construction and character of the new composite adhesive sheet may best be understood by consideration of its manner of use. That is, the composite sheet comprises a release carrier sheet, an intervening anti-blocking layer, and an activatable adhesive layer having an active face exposed and constituting one face of the composite sheet. The exposed active face of the adhesive layer is disposed against a metal sheet, such as the reverse face of a nameplate or the like, and the assembly of metal sheet and composite sheet are pressed together between heated surfaces, for example, by passing the assembly between heated rolls. The adhesive layer is activated by the heat to establish a bond to the metal sheet. The assembly is then cooled and the release carrier sheet is stripped off, leaving a laminate of the metal sheet and the adhesive layer with the anti-blocking layer on the face of the adhesive layer opposite the metal sheet. At this point, if necessary, the laminate may be cut to form individual units, for example, individual nameplates which are then boxed for shipment.

In the laminate, whether before cutting or after cutting into individual units, the anti-blocking layer on the face of the adhesive prevents sticking together of the other plates or of the units with other units. At the point of final use the nameplate or the like is assembled with the article to which it is to be joined with the anti-blocking layer adjacent the article, and a heated platen is used to press the metal sheet, e.g. the nameplate against the article. It has been found that by making the anti-blocking layer sufficiently thin, or of a character such that it is taken up by a compatible adhesive, it does not interfere with the establishment of a strong permanent union of the adhesive layer with the article to which the metal plate is to be joined.

The composite sheet ordinarily is formed on the release carrier sheet by deposition of the successive component layers on the surface of the sheet. The release carrier sheet may be any of the well-known, usually paper base, sheets with an anti-stick surface, e.g. paper coated or impregnated with silicones, polymers of tetrafluoroethylene or trifluorochloroethylene, or other known anti-stick materials. The anti-blocking layer is deposited on the surface of this release carrier sheet by any convenient method, such as spraying, brushing, dipping, knife coating, or the like. The anti-blocking layer is a very thin continuous layer which may be of the order of 0.0001″ or less, of a material which is non-tacky at room temperature and under conditions of storage. Preferred materials are the polymers of ethylene alone or with a small proportion of other polymerizable monomer, e.g. vinyl acetate or an alkyl acrylate such as ethyl acrylate; but other materials, such as natural waxes, high molecular weight wax-like polyethylene glycols, paraffin wax, polyisopropylene, and the like, and mixtures of these, may be used. These materials may be deposited from solutions in volatile organic solvents or from aqueous emulsions or latices, or may be formed by application from molten condition. In general, because of the extreme thinness of the layer, it is preferred to deposit the anti-blocking material from an organic solvent. It is believed that the deposited layer is maintained in engagement with the release carrier sheet primarily by the close conformity of the layer with the surface of the carrier sheet. The union is not strong, but is sufficient to hold the anti-blocking layer in place during subsequent treatments and to protect it against accidental displacement in handling.

The activatable adhesive layer is formed on the exposed face of the anti-blocking layer by deposition from solution in volatile organic solvent or from aqueous suspensions or latices, although with appropriate precautions it may also be deposited from molten condition. Care is taken that the solvents used in deposition from solution, or the temperature in application of the adhesive from molten condition do not disrupt or displace the anti-blocking layer. Any desirable thickness of adhesive may be used; but in general 0.0015 to 0.002″ is preferred from the standpoint of economy and effectiveness.

A wide variety of adhesive materials may be used in the composite adhesive sheet. A preferred adhesive is a resinous condensation product of one or more aromatic or saturated aliphatic dicarboxylic acids such as sebacic acid, azelaic acid, dimerized linoleic acid, terephthalic acid and isophthalic acid and a glycol such as a butylene glycol, ethylene glycol, polypropylene ether glycol and the like. Preferred polyester condensates will be soluble in volatile organic solvents such as methylethyl ketone, acetone, tetrahydrofuran or the like. With thermoplastic resin adhesives, such as polyesters, polyamides, polyester amides, acrylic and methacrylic resins, it is desirable that the adhesive have a melting point at least 20° F. above the softening point of the anti-blocking layer. Adhesives based on mixtures of polyethylene with other resins, such as shown in the U.S. patents to Johnson 2,940,888 and Morris et al. 3,008,863, and polyamide based adhesives as described in the patent to Morris et al. 2,867,592, may also be used. Adhesives based on natural rubber or butadiene styrene polymer rubber may be particularly useful in connection with anti-blocking coatings of polyethylene because of the ability of such rubbers to take up molten polyethylene.

The following example is given to aid in understanding the invention; but it is to be understood that the invention is not restricted to the materials, portions or procedures set forth in the example.

EXAMPLE

A commercial release paper having silicone at its surface to prevent adhesion, is dip coated with a 3% solids solution in textile spirits of an ethylene-vinyl acetate copolymer (DQD 7268 of the Union Carbide Corporation) having a melting point of about 182° F. After application of the resin solution the coated paper was dried at room temperature to remove the solvent leaving an "anti-blocking" layer slightly less than 0.0001" in thickness on the silicone treated surface of the release paper.

Thereafter the anti-blocking layer was coated with an adhesive solution. The adhesive used was a 35% solids solution of a polyester resin melting at about 220° F. in a volatile solvent mixture comprising 4 parts of tetrahydrofuran to one part methyl chloride. The polyester resin was the condensate of mixed dibasic acids in the molar ratio of 3.4 mols terephthalic acid, 5.0 mols isophthalic acid and 1.6 mols of dibutyl sebacate with an amount of 1,4-butane diol to supply hydroxyl groups equivalent to the carboxyl groups of the acids. This condensate is further characterized as having a viscosity of from 240 to 330 centipoises as determined by the Brookfield Viscometer on a 25% solids solution in tetrahydrofuran at 25° C. using the No. 2 Spindle at 30 r.p.m.

After application of the adhesive coating, the coating was dried to remove the solvent leaving an adhesive layer about 0.002" in thickness strongly held to the anti-blocking layer of ethylene vinyl acetate copolymer which was in clinging relation to the surface of the release carrier sheet.

In use, the composite sheet was disposed with the adhesive layer against a metal nameplate master sheet and the assembly of composite and metal sheet were joined by passing between metal rolls. The roll adjacent the composite sheet was maintained at a temperature of 350° to 400° F. and the rolls were pressed together at a pressure of about 10 to 15 lbs. In passing through the rolls, the metal and the adhesive were heated, and a strong union was established between the adhesive and the metal. After cooling, the release carrier sheet was stripped from the assembly leaving a laminate of the adhesive layer bonded to the metal with the anti-blocking layer covering the adhesive layer. This laminate was cut to form individual nameplates which were then boxed for shipment.

After shipment, it was found that the nameplates retained their individuality and did not tend to stick together. For attachment to a metal appliance casing, the nameplate was assembled with the anti-blocking layer adjacent the surface of the appliance. The assembly was then placed in a press with a heated platen against the metal nameplate to heat the metal and the adhesive to a temperature from about 350° to about 400° F. This temperature was reached in about 8 seconds. On removal of the heating platen and cooling it was found that the nameplate was firmly adered to the casing and could not be removed without destruction. On examination of the bond between the metal platen and the casing, it was seen that the adhesive layer had displaced the anti-blocking layer from the surface of the casing to establish a strong bond.

Having thus described my invention, what I claim as new and desire to secure by Letters Patent of the United States is:

1. An adhesive film composite for applying a protected heat activatable adhesive layer capable of securing sheet material to a surface, said composite comprising an adhesive layer, a paper base release carrier sheet having an anti-stick surface and a heat fusible thin continuous layer of anti-blocking material in direct covering contact with a first side of the adhesive layer and in intimate clinging engagement to the surface of said carrier sheet, the strength of engagement of said anti-blocking layer with the surface of the carrier sheet being only sufficient to hold the adhesive layer on the surface of the carrier sheet for handling the adhesive film composite prior to union of the second side of the adhesive layer with a first surface and said engagement being readily rupturable to allow stripping of the carrier sheet to leave said anti-blocking layer on the free surface in protective relation to said first side of the adhesive layer to resist blocking and sticking of the adhesive layer to other surfaces after removal of the carrier sheet, said layer of anti-blocking material being of such thinness and formed of a material reducible by the temperature of heat activation of said adhesive to a fluid state whereby the layer is displaceable from said protective relation to said adhesive layer and does not prevent adhesion of the adhesive layer to a second surface when the heat activated adhesive layer with fluid anti-blocking material on its surface is pressed against said second surface.

2. An adhesive film composite as defined in claim 1 in which the adhesive of said adhesive layer is a heat activatable adhesive and in which the anti-blocking material is a thermoplastic material having a melting point at least 20° F. lower than the activation temperature of said adhesive.

3. An adhesive film composite as defined in claim 2 in which the adhesive of said adhesive layer is heat activatable and in which said anti-blocking material is heat fusible and is soluble in said adhesive layer when in molten condition.

4. An adhesive film composite as defined in claim 2 in which the adhesive of said adhesive layer comprises a resinous condensate of a glycol with at least one member of the group consisting of aromatic and saturated aliphatic dicarboxylic acids.

References Cited

UNITED STATES PATENTS

| | | | |
|---|---|---|---|
| 1,966,942 | 7/1934 | Atkinson | 117—3.4 X |
| 2,101,876 | 12/1937 | Scott | 117—76 |
| 2,730,459 | 1/1956 | Holmen et al. | 117—76 |
| 2,746,877 | 5/1956 | Matthes | 117—76 X |
| 2,811,408 | 10/1957 | Braley | 117—5.1 |
| 3,230,289 | 1/1966 | Eder et al. | 117—76 X |

WILLIAM D. MARTIN, Primary Examiner

B. PIANALTO, Assistant Examiner

U.S. Cl. X.R.

117—3.4, 122